(12) United States Patent
Lapp et al.

(10) Patent No.: US 10,442,292 B2
(45) Date of Patent: Oct. 15, 2019

(54) SYSTEM FOR INFINITELY VARIABLE SPEED CONTROL

(71) Applicant: Schiller Grounds Care, Inc., Southampton, PA (US)

(72) Inventors: Jonathan Lapp, Johnson Creek, WI (US); Chapin C. Nault, Madison, WI (US)

(73) Assignee: Schiller Grounds Care, Inc., Southampton, PA (US)

(*) Notice: Subject to any disclaimer, the term of this patent is extended or adjusted under 35 U.S.C. 154(b) by 131 days.

(21) Appl. No.: 15/842,273

(22) Filed: Dec. 14, 2017

(65) Prior Publication Data

US 2019/0184823 A1 Jun. 20, 2019

(51) Int. Cl.
*B60K 17/08* (2006.01)
*F16H 59/40* (2006.01)
*F16H 61/40* (2010.01)

(52) U.S. Cl.
CPC ............ *B60K 17/08* (2013.01); *F16H 59/40* (2013.01); *B60L 2240/12* (2013.01); *B60Y 2200/223* (2013.01); *F16H 61/40* (2013.01)

(58) Field of Classification Search
CPC ..... B60K 17/08; B60K 17/16; B60L 2240/12; F16H 59/40
USPC .......................................................... 701/93
See application file for complete search history.

(56) References Cited

U.S. PATENT DOCUMENTS

| | | | |
|---|---|---|---|
| 4,048,871 A | 9/1977 | Fyock | |
| 4,698,048 A | 10/1987 | Rundle | |
| 5,335,487 A | 8/1994 | Murakawa et al. | |
| 5,417,193 A | 5/1995 | Fillman et al. | |
| 6,668,530 B2* | 12/2003 | Kern | A01D 34/006 123/361 |
| 7,288,047 B1 | 10/2007 | Hitt et al. | |
| 7,331,167 B1* | 2/2008 | Drake | A01D 34/62 56/10.2 G |
| 7,472,684 B1* | 1/2009 | McKee | B60K 31/00 123/352 |
| 7,900,739 B2* | 3/2011 | Bulgrien | F02D 31/001 123/349 |
| 9,725,114 B1* | 8/2017 | Brown | B62D 11/04 |

(Continued)

*Primary Examiner* — Thomas G Black
*Assistant Examiner* — Wae L Louie
(74) *Attorney, Agent, or Firm* — Panitch Schwarze Belisario & Nadel LLP

(57) ABSTRACT

A zero-turn ("ZT") vehicle is provided with a mainframe and an engine supported on the mainframe to output rotational power. Transaxle systems are provided with each being connected to the engine and to a respective driving wheel such that each transaxle system is configured to translate the rotational power from the engine to the driving wheel. One or more speed control actuators are provided, each being operatively connected to a transaxle system and movable between a minimum position and a maximum position. The speed of a driving wheel is infinitely variable through movement of the speed control actuator. A speed-range control actuator is operatively connected to the transaxle systems and configured to designate one of selectable speed-ranges within which the speed control actuators are permitted to operate. The speed of each driving wheel is determined by a combination of the designated speed-range and a position of the speed control actuator.

18 Claims, 4 Drawing Sheets

(56) References Cited

U.S. PATENT DOCUMENTS

| | | | |
|---|---|---|---|
| 9,864,396 B1* | 1/2018 | Brown | A01D 34/006 |
| 10,214,869 B1* | 2/2019 | Krajewski | E01H 5/09 |
| 2010/0192532 A1 | 8/2010 | Slater et al. | |
| 2015/0292499 A1* | 10/2015 | Heathcoat, Jr. | F04B 1/324 |
| | | | 417/53 |
| 2017/0001664 A1* | 1/2017 | Inal | B62D 11/105 |

* cited by examiner

SYSTEM FOR INFINITELY VARIABLE SPEED CONTROL

BACKGROUND

Aspects of the present disclosure relate to systems and techniques that may be used to infinitely control a speed of a zero-turn ("ZT") vehicle, particularly a ZT lawnmower.

A ZT vehicle typically includes a frame and three or four wheels, such as one or two swiveling wheels mounted toward a front of the frame and two relatively large driving wheels at a rear of the frame. The driving wheels rotate independently of each other based on input from an operator. The operator can control the rotational speeds of the driving wheels via control levers, each associated with a respective driving wheel. Currently-available ZT vehicles, such as ZT lawnmowers, generally have only one speed-range, namely, the rotating speed of each driving wheel corresponds directly to a position of the respective control lever.

ZT vehicles, particularly ZT lawnmowers, may have different operating conditions. For example, a ZT lawnmower may have separate conditions for a grass cutting operation and a transportation operation: a lower speed-range is desired for a ZT lawnmower to get reliable control and better cutting result when cutting grass; and a higher speed-range is desired for the same ZT lawnmower to transport the vehicle more quickly and safely in between two job sites or back to a transport truck. However, one speed-range ZT vehicles do not satisfy this purpose.

Currently, there are two approaches dealing with the abovementioned issue. A first approach utilizes a pair of control levers that operate the lawnmower in a single wide speed-range from zero up to a high transport speed. A second approach provides a pair of levers that operate in a single speed-range, similar to the first solution, and a second lever/mechanism that can adjust an upper limit of the single speed-range.

The first approach allows for a larger or wider range of speed adjustment, but can lose resolution (precision) or lose control when operating at a lower cutting speed. The second approach allows for speed-range adjustments, but only between two predefined settings (e.g., high/low). In addition, the pair of control levers, as well as the speed-range adjustment lever, are all operated by hand, meaning the operator must let go of one lever to switch to the other. Therefore, the speed-range of the machine can't be safely adjusted "on the fly", i.e., the machine must be stopped to adjust the speed-range.

In view of the foregoing reasons, it is desirable for a ZT lawnmower to have at least two different driving speed-ranges that can be adjusted "on the fly" by an operator.

BRIEF SUMMARY OF THE DISCLOSURE

Aspects of the present disclosure relate to a zero-turn ("ZT") vehicle that includes a mainframe, an engine supported on the mainframe and configured to output rotational power and two or more driving wheels rotatably mounted to an underside of the mainframe. Two or more transaxle systems are provided, each being connected to the engine and to a respective driving wheel such that each transaxle system is configured to translate the rotational power from the engine to the respective driving wheel. One or more speed control actuators are provided, each being operatively connected to at least one of the transaxle systems and being movable between a minimum position corresponding to a minimum driving speed of at least one of the driving wheels and a maximum position corresponding to a maximum driving speed of the at least one of the driving wheels. The driving speed is infinitely variable between the minimum and maximum driving speeds through movement of the speed control actuator between the minimum and maximum positions. A speed-range control actuator is operatively connected to the two or more transaxle systems and configured to designate one of two or more selectable speed-ranges within which the one or more speed control actuators are permitted to operate, the speed of each driving wheel being determined by a combination of the designated speed-range and a position of the one or more speed control actuators.

The one or more speed control actuators comprise a pair of speed control levers, each operatively coupled to a movable speed control arm of a respective transaxle system. Each of the speed control levers is coupled to a respective speed control arm via a speed control bar or a speed control cable.

In further detail, the speed-range control actuator is a speed-range pedal that is operatively coupled to speed-range arms of each of the two or more transaxle systems. The speed-range pedal is coupled to each of the speed-range arms via a speed control bar or a speed control cable.

The speed-range control actuator includes a minimum position corresponding to a minimum speed-range and a maximum position corresponding to a maximum speed-range, with the speed-range being infinitely variable between the minimum and maximum speed-ranges through movement of the speed-range control actuator between the minimum and maximum positions. The speed-range control actuator is movable regardless of a position of the one or more speed control actuators.

In still further detail, the one or more speed control actuators include a left speed control lever and a right speed control lever. The left speed control lever is operatively connected to a left transaxle system of the two or more transaxle systems for controlling a left speed of a left driving wheel of the two more driving wheels. The right speed control lever is operatively connected to a right transaxle system of the two or more transaxle systems for controlling a right speed of a right driving wheel of the two more driving wheels. A combination of the left speed and the right speed determines a driving speed and a driving direction of the vehicle.

A zero-turn ("ZT") lawnmower is also disclosed herein to include a mainframe, an engine supported on the mainframe and configured to output rotational power, two or more driving wheels rotatably mounted to an underside of the mainframe and one or more driven wheels rotatably mounted to the mainframe for supporting the mainframe along with the driving wheels. A mowing deck is connected to the mainframe and operatively coupled to the output of the engine for rotating one or more blades mounted in the mowing deck. An operator seat or platform is attached to the mainframe. Two or more transaxle systems are provided, each connected to the engine and to a respective driving wheel such that each transaxle system is configured to translate the rotational power from the engine to the respective driving wheel. One or more speed control actuators are provided, each being operatively connected to at least one of the transaxle systems and being movable between a minimum position corresponding to a minimum driving speed of at least one of the driving wheels and a maximum position corresponding to a maximum driving speed of the at least one of the driving wheels. The driving speed is infinitely variable between the minimum and maximum driving speeds through movement of the speed control actuator between the minimum and maximum positions. A speed-range control actuator is operatively connected to the two or more transaxle systems and configured to designate one of two or more selectable speed-ranges within which the one or more speed control actuators are permitted to operate. The speed of each driving wheel is determined by a combination of the designated speed-range and a position of the one or more speed control actuators.

The one or more speed control actuators comprise speed a pair of control levers, each of the speed control levers being operatively coupled to a movable speed control arm of a respective transaxle system. Each of the speed control levers is coupled to a respective speed control arm via a speed control bar or a speed control cable.

In further detail, the speed-range control actuator is a speed-range pedal that is operatively coupled to speed-range arms of each of the two or more transaxle systems. The speed-range pedal is coupled to each of the speed-range arms via a speed control bar or a speed control cable.

The speed-range control actuator is configured to disengage the mowing deck from the output of the engine when the speed-range control actuator is moved to designate one of the two or more speed ranges.

In still further detail, the speed-range control actuator includes a minimum position corresponding to a minimum speed-range and a maximum position corresponding to a maximum speed-range, with the speed-range being infinitely variable between the minimum and maximum speed-ranges through movement of the speed-range control actuator between the minimum and maximum positions. The speed-range control actuator is movable regardless of a position of the one or more speed control actuators.

In still further detail, the one or more speed control actuators include a left speed control lever and a right speed control lever. The left speed control lever is operatively connected to a left transaxle system of the two or more transaxle systems for controlling a first speed of a left driving wheel of the two more driving wheels. The right speed control lever is operatively connected to a right transaxle system of the two or more transaxle systems for controlling a second speed of a right driving wheel of the two more driving wheels. A combination of the left speed and the right speed determines a driving speed and a driving direction of the vehicle.

An infinitely speed variable control system is also disclosed herein, which includes two or more transaxle systems, each being connected to a respective driving wheel such that each transaxle system is configured to translate the rotational power to the respective driving wheel. One or more speed control actuators are provided, each being operatively connected to at least one of the transaxle systems and being movable between a minimum position corresponding to a minimum driving speed of at least one of the driving wheels and a maximum position corresponding to a maximum driving speed of the at least one of the driving wheels. The driving speed is infinitely variable between the minimum and maximum driving speeds through movement of the speed control actuator between the minimum and maximum positions. A speed-range control actuator is operatively connected to the two or more transaxle systems and configured to designate one of two or more selectable speed-ranges within which the one or more speed control actuators are permitted to operate. The speed of each driving wheel is determined by a combination of the designated speed-range and a position of the one or more speed control actuators.

BRIEF DESCRIPTION OF ACCOMPANYING DRAWINGS

The following detailed description of preferred embodiments of the invention will be better understood when read in conjunction with the appended drawings. For the purpose of illustration, there are shown in the drawings embodiments which are presently preferred. It should be understood, however, that the invention is not limited to the precise arrangements and instrumentalities shown.

Figure 1:
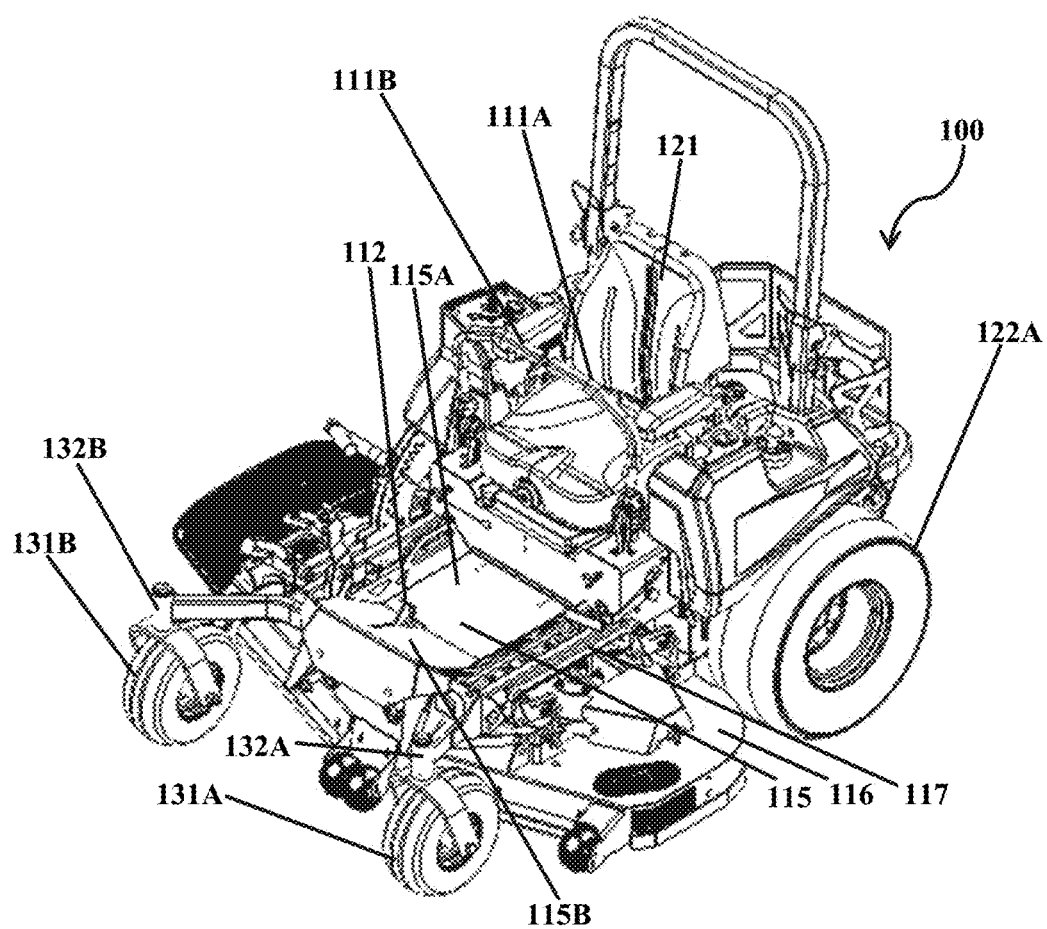
FIG. 1 is a front side perspective view of a ZT vehicle in accordance with a preferred embodiment of the present invention.

It should be further noted that the figures are not drawn to scale and that elements of familiar structures or functions are generally represented by like reference numerals for illustrative purpose throughout the figures. It also should be noted that the figures are only intended to facilitate the description of the various aspects of this disclosure, and therefore, do not illustrate every aspect of this disclosure and do not limit the scope of this disclosure.

DETAILED DESCRIPTION OF ASPECTS OF THE DISCLOSURE

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the apparatus and designated parts thereof. The terminology includes the above-listed words, derivatives thereof, and words of similar import. Additionally, the words "a" and "an", as used in the claims and in the corresponding portions of the specification, mean "at least one."

FIG. 1 shows a ZT vehicle, provided in the present embodiment as a lawnmower 100, that includes a foot pedal 112 for infinitely adjusting an operating speed-range of the ZT lawnmower 100. Referring to FIG. 1, the ZT lawnmower preferably includes a mainframe 117 for supporting and/or attaching other structural elements and/or components of the ZT lawnmower 100. The mainframe 117 may be made of steel or other suitable metallic or polymeric material, e.g., a plastic material, and is preferably in the form of a rectangle extending between front and rear sides of the ZT lawnmower 100. Although shown and described as the ZT lawnmower 100 for purposes of illustration only, this disclosure may apply to other types of ZT vehicles as well.

In the embodiment shown in FIG. 1, a first driving wheel 122A and a second driving wheel 122B (not shown in FIG. 1) and two swiveling wheels 131A, 131B are rotatably attached to and support the mainframe 117, and may be used to control a movement direction and speed of the ZT lawnmower 100. The swiveling wheels 131A, 131B may be positioned at a front end of the mainframe 117 and are attached thereto via corresponding swivel brackets 132A, 132B. The swivel brackets 132A, 132B are attached to the mainframe 117 for rotation about vertically extending rotational axes (not shown in FIG. 1), which allow the swiveling wheels 131A, 131B to change direction freely to be in line with a moving direction of the ZT lawnmower 100. Although shown and described as having two swiveling wheels 131A, 131B for purposes of illustration only, the ZT lawnmower 100 may be equipped with any number of swiveling wheels, such as, one swiveling wheel or three or more swiveling wheels.

The driving wheels 122A, 122B are preferably positioned at and rotatably mounted to a rear underside of the mainframe 117. The driving wheels 122A, 122B are coupled to an engine (not shown) of the ZT lawnmower 100 for receiving rotational power therefrom to drive the ZT lawnmower 100 and control the moving direction of the ZT lawnmower 100. The moving direction of the ZT lawnmower 100 may be controlled by adjusting the relative speeds and rotational directions of the driving wheels 122A, 122B.

The engine may be supported on the mainframe 117 and may be a gasoline or diesel engine that is configured to provide rotational power for driving the ZT lawnmower 100 and/a cutting (or mowing) deck 116. An output speed of the engine may be substantively constant or controllably variable according to the desired operating conditions of the ZT lawnmower.

The cutting deck 116 may be positioned rearwardly of the swiveling wheels 131A, 131B and attached to an under side of the mainframe 117. The cutting deck 116 may include cutting blades 127A, 127B, 127C (shown in FIG. 2A) for cutting grass when the ZT lawnmower 100 is operating in a grass-cutting mode, as is conventionally known.

A foot rest plate 115 may be provided at a front portion of the mainframe 117 and attached to an upper side of the mainframe 117. The foot rest plate 115 may include a flat section 115A and a slanted section 115B connected therewith for resting feet of an operator while operating the ZT lawnmower 100. An operator seat 121 may be fixedly attached to and positioned above a rear portion of the mainframe 117

One or more speed control actuators may be provided to control speeds of the driving wheels. In the embodiment shown in FIG. 1, the a pair of speed control levers 111A, 111B are provided as the speed control actuators, each of which controls the speed of a respective driving wheel. Each speed control actuator 111A, 111B is preferably movable with respect to the mainframe 117 through a plurality of positions, each corresponding to a different speed of the respective driving wheel.

In FIG. 1, the pair of speed control levers 111A, 111B are provided in front of the operator seat 121, and may by placed in convenient positions for the operator to maneuver the ZT lawnmower 100. Each of the speed control levers 111A, 111B is operatively connected to the first driving wheel 122A and the first driving wheel 122B, respectively, for independently controlling rotational speeds thereof. For example, when the left speed control lever 111A is pushed forward or pulled rearward, the left driving wheel 122A may rotate forward or rearward, respectively; and, when the right speed control lever 111B is pushed forward or pulled rearward, the right driving wheel 122B may rotate forward or rearward, respectively. Rotational speeds of the driving wheels 122A, 122B may be determined by a relative forward or rearward position or a rearward position of the speed control levers 111A, 111B. There may be a plurality of forward positions and/or a plurality of rearward positions of the speed control levers 111A, 111B provided for controlling the rotation speeds of the drive wheels 122A, 122B. In some embodiments of this disclosure, the rotational speeds of the driving wheels 122A, 122B may be infinitely variably controlled between zero and maximum forward/rearward speeds via the speed control levers 111A, 111B. While the present embodiment shows the one or more speed control actuators as a pair of speed control levers 111A, 111B, other types of actuators can be used as well, such a single joystick (not shown) that can be used to manipulate the speeds of both drive wheels 122A, 122B.

Additionally, a speed-range control actuator, e.g., a speed-range pedal 112, may be provided to designate one of two or more selectable speed-ranges within which the speed control actuators 111A, 111B are permitted to operate. The speed of each driving wheel 122A, 122B is preferably determined by a combination of the a position of the designated speed-range actuator 112 and a position of the respective speed control actuator 111A, 111B. The speed-range determined by the speed-range pedal 112 preferably applies to both driving wheels 122A, 122B collectively.

Although shown and described as being a speed-range pedal 112 for illustration only, the speed-range control actuator may be provided in other suitable forms, e.g., a tensioned hand lever (not shown), or the like. According to some aspects of this disclosure, when the speed-range control actuator is activated, e.g., when the speed-range pedal 112 is pressed or the tensioned hand lever is pushed or pulled, the cutting deck 116 may be disengaged from the output of the engine to stop rotations of blades 127A, 127B, 127C (shown in FIG. 2A) of the cutting deck 116. For example, the cutting deck 116 may be engaged to rotate the blades 127A, 127B, 127C when the speed-range control actuator is activated, and an interlock mechanism (not shown) can be provided between the speed-range control actuator and the cutting deck 116 that operates to disengage the cutting deck 116 from rotating the blades 127A, 127B, 127C when the mower 100 enters the "transport" mode. This provides safety during transportation of the mower 100, and improves the quality of cut, as cutting grass at high speeds, such as those used for transporting the mower 100, tends to be very difficult.

In general, the ZT lawnmower 100 under this disclosure may advantageously have at least two different driving speed-ranges with a first speed-range being different from a second speed-range. For example, the first speed-range may be lower than the second speed-range. Different driving speed-ranges may be used for different operation modes of the ZT lawnmower 100. For example, the first speed-range can be used when the lawnmower is operating in a grass-cutting mode; and the second speed-range can be used in a non-grass-cutting mode, such as, when the lawnmower is transported to or from a cutting site. The first speed-range is preferably lower than the second speed-range for ensuring more control of the ZT lawnmower in the grass-cutting mode and to acquire better cutting result.

In the embodiment of FIG. 1, for example, when the speed-range pedal 112 is not pressed, the ZT lawnmower 100 may operate within a first speed-range of zero to five miles per hour. The left driving wheel 122A of the ZT lawnmower 100, for example, may operate under a first left speed selected from the first speed-range, such as, three miles per hour, which corresponds to a particular forward position of the left speed control lever 111A. The right wheel 122B of the ZT lawnmower 100 may operate under a first right speed selected from the first speed-range, such as, four miles per hour, which corresponds to a different forward position of the right speed control lever 111A. When the speed-range pedal 112 is pressed, the driving wheels 122A, 122B of the ZT lawnmower 100 may operate under a second speed-range of, for example, three to eight miles per hour, and the speeds of the driving wheels 122A, 122B may increase, respectively, to six and eight miles per hour if the positions of the speed control levers 111A, 111B are not changed. By pressing the speed-range pedal 112 to a different position, the speed-range of the ZT lawnmower 100 can be adjusted without taking hands off the speed control levers 111A, 111B, i.e., the speed-range pedal 112 can be adjusted regardless of the positions of the speed control levers 111A, 111B. Thus, the aspect of this disclosure allows for safer operation of the ZT lawnmower 100 and for adjustment of the speed-range "on the fly", namely, without stopping the ZT lawnmower 100.

According to aspects of this disclosure, both the speed-range and the speed selected from a specific speed-range may be infinitely variable through actuation of the speed-range pedal 112 and the speed control levers 111A, 111B, respectively. In use, for example, the operator of the ZT lawnmower 100 pushes one or two of the speed control levers 111A, 111B with the speed-range pedal 112 not being pressed, which corresponds to a first speed-range. The ZT lawnmower 100 may run at speeds selected from the first speed-range, the first speeds corresponding to positions of the speed control levers 111A, 111B. When the operator presses the speed-range pedal 112, a second speed-range may be selected for operating the ZT lawnmower 100. The speeds of the driving wheels 122A, 122B of the ZT lawnmower 100 may be adjusted to speeds selected from the second speed-range, the actual speeds of the driving wheels 122A, 122B corresponding to the positions of the speed control levers 111A, 111B under the second speed-range. Similarly, when the operator changes to a third speed-range by depressing or further pressing the speed-range pedal 112, the driving wheels 122A, 122B of the ZT lawnmower 100 may adjust to a speed corresponding the positions of the speed control levers 111A, 111B under the third speed-range.

Although one speed-range pedal 112 is provided for controlling both left and right driving wheels 122A, 122B for illustration only, two speed-range pedals may be provided, each adjusting one or more speed-ranges for a corresponding one of the driving wheels 122A, 122B.

Figure 2A:
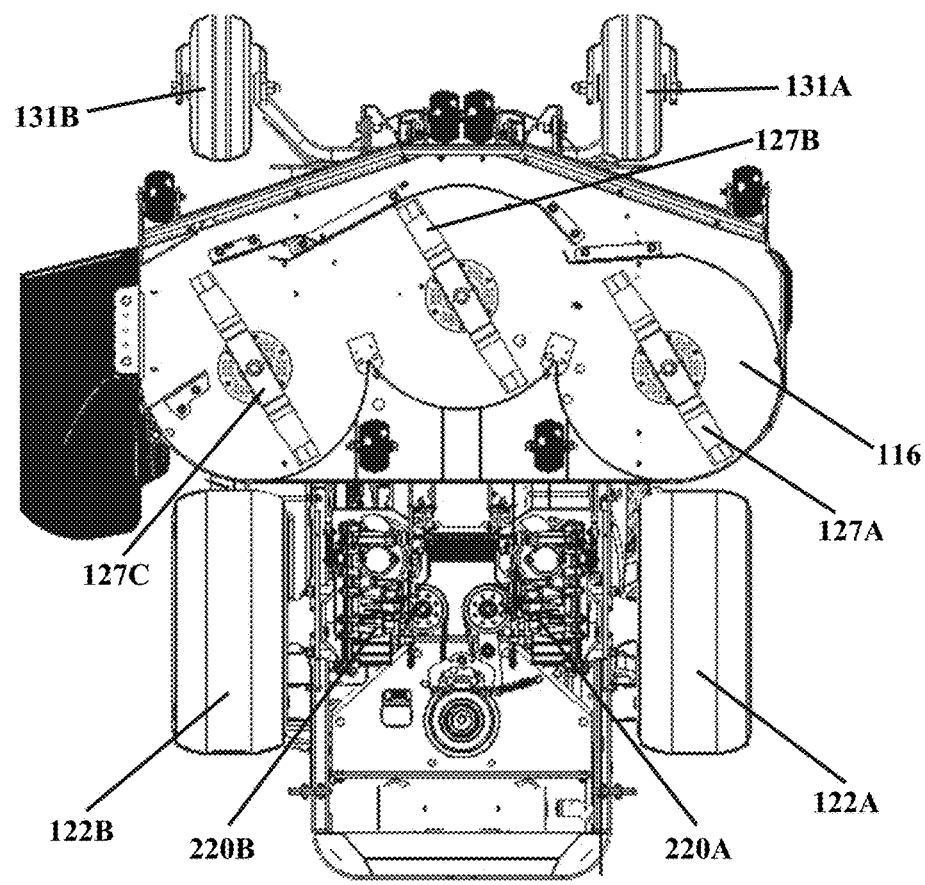
FIG. 2A is a bottom plan view of the ZT vehicle of FIG. 1.
Figure 2B:
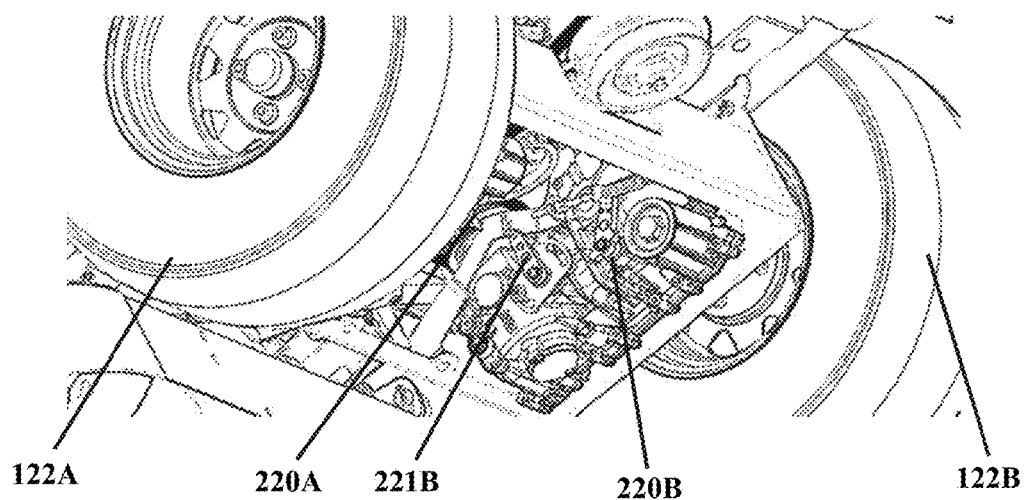
FIG. 2B is a partial bottom perspective view of the ZT vehicle of FIG. 1.

FIGS. 2A and 2B show bottom views of the ZT lawnmower 100. Two or more transaxle systems 220A, 220B may be provided and configured to translate rotational power from the engine of the ZT lawnmower 100 to the respective driving wheels 122A, 122B. In FIGS. 2A and 2B, a left transaxle system 220A and a right transaxle system 220B are provided, each being connected to a respective one of the driving wheels 122A, 122B. The transaxle systems 220A, 220B may be any type of hydrostatic transmission systems having two or more speed control mechanisms.

The left transaxle system 220A may operate independently from the right transaxle system 220B, so that, the left driving wheel 122A and the right driving wheel 122B may rotate independently in different speeds and/or directions. The speed and/or direction differences may be controllable to generate left or right turns of the ZT lawnmower 100, while the swiveling wheels 131A, 131B change orientations to follow a moving direction of the ZT lawnmower 100.

The two or more speed mechanisms of each of the transaxle systems 220 may provide at least two different speed-ranges for various operation modes of the ZT lawnmower 100, a first speed-range being lower than a second speed-range. For example, the first speed-range may be used in a grass-cutting operation mode, when blades 127A, 127B, 127C of the cutting deck 116 are spinning while the ZT lawnmower 100 is moving. The second speed-range may be used in a non-grass-cutting mode, when the blades 127A, 127B, 127C are not spinning while the ZT lawnmower 100 is moving.

According to some aspects of this disclosure, the speed-ranges of the transaxle systems 220A, 220B may be infinitely adjusted or controlled. Additionally, an output speed of each of the transaxle systems 220A, 220B within any speed-range selected from the speed-ranges may be infinitely adjusted or controlled. In other words, the output speed of the each of the transaxle systems 220A, 220B may be controlled in an infinitely variable manner according to a combination of a selected speed-range and a selected speed with the speed-range.

Figure 3:
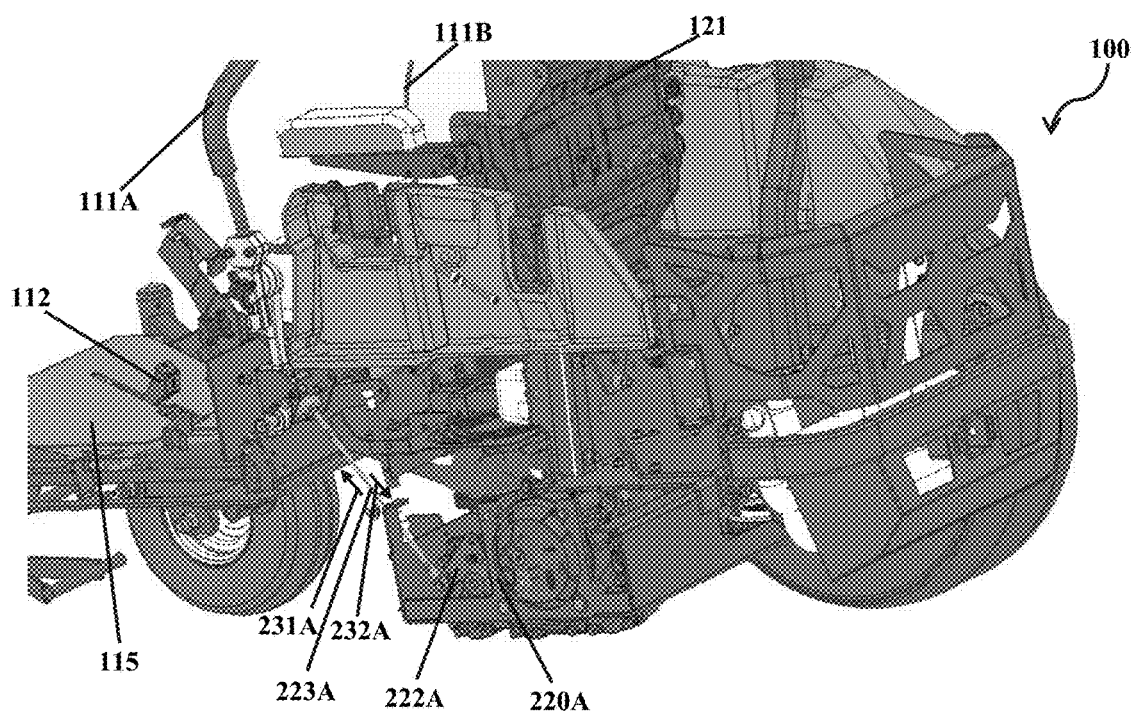
FIG. 3 is a left side perspective cross-sectional view of the ZT vehicle of FIG. 1.

FIG. 3 illustrates a sectional perspective view of the ZT lawnmower 100. In FIG. 3, the left speed control lever 111A and the speed-range control pedal 112 are shown for the purpose of controlling the left transaxle system 220A that is coupled to the left driving wheel 122A (not shown).

The left transaxle system 220A may include at least two speed control mechanisms, namely a speed-range control mechanism and a speed control mechanism. The speed-range control mechanism of the left transaxle system 220A may include a left speed-range control arm 221A (shown in FIG. 5) for selecting a speed range of the left transaxle system 220A. The speed control mechanism of the left transaxle system 220A may include a left speed control arm 222A for selecting a speed within the selected speed range.

The speed-range control pedal 112 may be operatively connected to the left speed-range control arm 221A via a mechanical connection (not shown in FIG. 3), e.g., one or more connecting cables or one or more connecting rods (not shown), such that, the left speed-range control arm 221A may manipulated in a selected direction based on a position of the speed-range control pedal 112. The speed-range control pedal 112 may be biased toward a rest position (or non-activated position) through a spring (not shown) or the like. When the speed-range control pedal 112 is in the rest position, the left transaxle system 220A operates under a first speed-range, e.g., a minimum speed-range.

When the speed-range control pedal 112 is pressed, the connecting cables or rods are consequently moved to change a position of the left speed-range control arm 221A, and a second speed-range of the left transaxle system 220A may therefore be selected. The left transaxle system 220A may operate under the newly selected speed-range. When the speed-range control pedal 112 is released, the speed-range control pedal 112 may return to the rest position and the left transaxle system 220A may return to the first speed-range as the left speed-range control arm 221A is returned to its original position.

The left speed control lever 111A may be connected to the left speed control arm 222A via a left control rod 223A. The left control rod has one end thereof connected with the left speed control lever 111A and the other end thereof connected to the left speed control arm 222A. When the left speed control lever 111A is manipulated forward or rearward, the left control rod 223A may move in a first direction 231A or a second direction 232A, respectively. The left control rod 223A then actuates the left speed control arm 222A to select the speed of the left transaxle 220A within a selected speed range.

Although shown and described as a single rod for purposes of illustration only, the left control rod 223A may include multiple rods or other types of linkages jointly connected together, which may pass motion of the left speed control lever 111A to the left speed control arm 222A.

The left transaxle system 220A is shown and described for purposes of illustration only. The ZT lawnmower 100 includes a right transaxle system 220B that may be controlled by the speed-range control pedal 112 and a right speed control lever 111B and that may operate in a similar manner as the left transaxle system 220A. Preferably, the speed-range control pedal 112 is connected to both the left and right speed-range control arms 221A, 221B of the left and right transaxles 220A, 220B, so that actuation of the speed-range control pedal 112 simultaneously manipulates the speed-range control arms 221A, 221B of both transaxles 220A, 220B. However, other methods of actuation, including independent actuation, can be utilized as well.

According to some aspects of this disclosure, the speed-range pedal 112 may select predetermined speed-ranges or adjust speed-ranges in an infinite manner. The speed position of the left and right speed control levers 111A, 111B may be infinitely variable to achieve infinite variable speed controls of the left and right transaxle system 220A, 220B.

Figure 4:
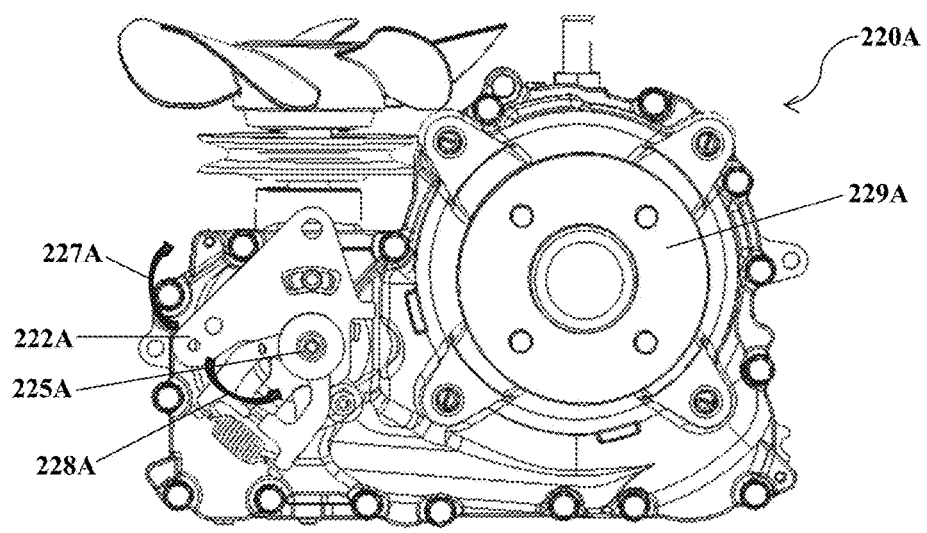
FIG. 4 is a left side elevational view of a left transaxle system for controlling the speed of the ZT vehicle of FIG. 1.

FIG. 4 shows a left side view of the left transaxle system 220A of the ZT lawnmower 100. Referring to FIG. 4, the left transaxle system 220A may include an output shaft 229A that couples to and outputs rotational power to the left driving wheel 122A (shown in FIG. 2A). The output shaft 229A may be connected to the left driving wheel 122A via any conventional mechanical coupling elements, such as bolts or the like. The output shaft 229A may selectively rotate in either counterclockwise or clockwise direction, with the direction and speed thereof being controlled via the speed control arm 222A and/or the speed-range control arm 221A (shown in FIG. 5).

The speed control arm 222A may have a rest position (or non-activated position) and may be rotatable about a pivot pin 225A to other positions in either a clockwise direction 227A or a counterclockwise direction 228A. The rest position of the speed control arm 222A may correspond to a minimum rotating speed, e.g., a zero rotating speed, of the output shaft 229A in either direction. The other positions of the speed control arm 222A may correspond to rotating directions and speeds relative to the positions within a speed-range selected by the speed-range arm 221A.

Referring back to FIG. 3, when the left speed control lever 111A is in a rest position, the left speed control lever 111A exerts no force to the speed control arm 222A. The speed control arm 222A is therefore in the rest position corresponding to a zero output speed of the output shaft 229A of the left transaxle 220A.

When the left speed control lever 111A is pulled towards the operator seated in the operator seat, the left control rod 223A is pulled in the first direction 231A. The speed control arm 222A that is connected to the left control rod 223A resultantly rotates in the clockwise direction 227A. The output shaft 229A therefore rotates in a clockwise direction to move the ZT lawnmower 100 in a rearward direction. When the left speed control lever 111A is pushed forward by the operator, the left control rod 223A is moved in the second direction 232A, which rotates the speed control arm 222A in the counterclockwise direction 228A. As a result, the output shaft 229A rotates in a counterclockwise direction to move the ZT lawnmower 100 in a forward direction.

According to some aspects of this disclosure, positions of the speed control arm 222A may be continuously distributed between the rest position and a maximum backward position in the counterclockwise direction 227A and between the rest position and a maximum forward position in the clockwise direction 228A. As a result of the continuously distributed positions of the speed control arm 222A, the rotation speed of the flange 229A may be infinitely adjusted between the rest position and the maximum rearward position and between the rest position and the maximum forward position.

The left speed control lever 111A, left speed control rod 223A and left transaxle system 220A are shown and described for purposes of illustration only. A right transaxle system 220B of the ZT lawnmower may be provided and controlled via a right speed control lever 111B in a similar manner as that provided with respect to the left transaxle system 220A.

Figure 5:
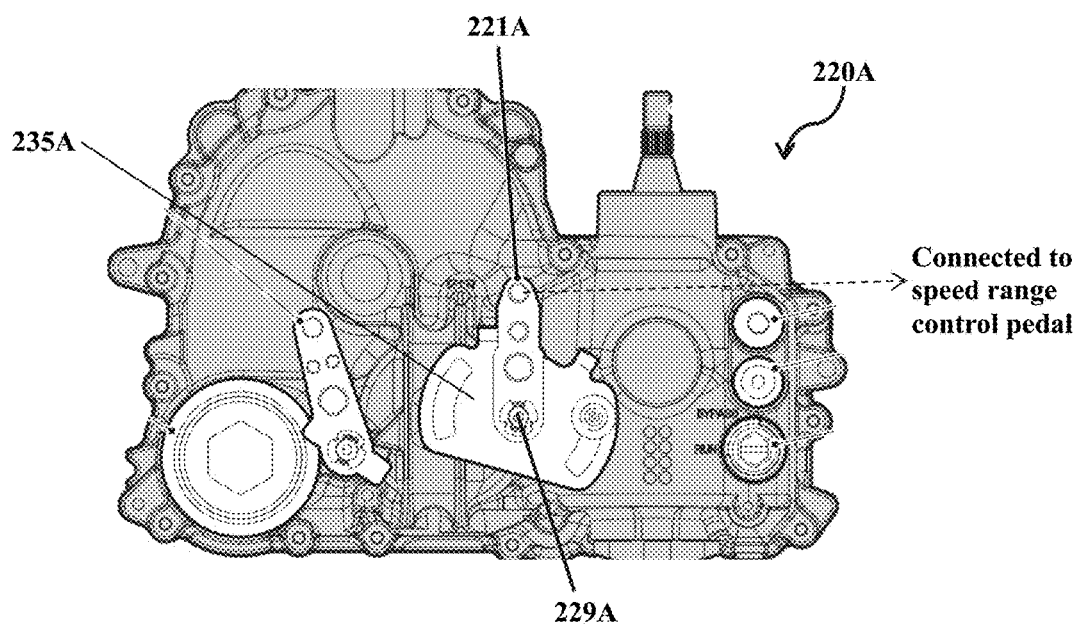
FIG. 5 is a right side elevational view of the left transaxle system of FIG. 4.

FIG. 5 shows a right side view of the left transaxle system 227A of the ZT lawnmower 100. A left speed-range control assembly 235B may be coupled with the left transaxle system 220A at the right side of the transaxle system 220A. The left speed-range control assembly 235A may include a left speed-range control arm 221A that is rotatable about a left range pivot pin 229A in a clockwise direction. The left speed-range control arm 221 may have a rest position that defines a lowest speed-range, a maximum speed-range position, and positions continuously distributed between the rest position and the maximum speed-range position. Therefore, the speed-range may be selected infinitely between a lowest speed-range and a maximum speed-range.

An end distally located from the left range pivot pin 229A may be connected with the speed-range control pedal 112 (shown in FIG. 3). When not actuated, the speed-range control pedal 112 and the left speed-range control arm 221A are preferably at their respective rest positions. When actuated, the speed-range control pedal 112 may pull (or push) the left speed-range control arm 221A, causing rotation about the left range pivot pin 229A, e.g., in a clockwise direction and away from the rest position toward one of the other speed-range positions.

Although shown and described by the left speed-range control arm 221A of the left transaxle system 220A for purposes of illustration only, the right speed-range control arm 221B of the right transaxle system 220B may work in a similar manner.

The output rotation speed of the left transaxle system 220A may be determined by a combination of a first position of the left speed-range control arm 221A and a second position of the left speed control arm 222A. Both of the speed-range and the speed within a speed-range may be adjusted infinitely, so that, the speed may be adjusted infinitely by the speed-range control pedal 112 and a left speed control lever 111A or right speed control lever 111B.

Although shown and described as being positioned at different sides of the left transaxle system 220A for purposes of illustration only, the speed-range control arm 221A and the speed control arm 222A may be positioned at any location on the left transaxle system 220A. Additionally, the right transaxle system 220B may be operated in a similar manner as that shown and described with reference to the left transaxle system 220A.

Various aspects of the disclosure have been presented above. However, the invention is not intended to be limited to the specific aspects presented above, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A zero-turn ("ZT") vehicle comprising:
    a mainframe;
    an engine supported on the mainframe and configured to output rotational power;
    two or more driving wheels rotatably mounted to an underside of the mainframe;
    two or more transaxle systems, each transaxle system being connected to the engine and to a respective driving wheel such that each transaxle system is configured to translate the rotational power from the engine to the respective driving wheel;
    one or more speed control actuators, each speed control actuator being operatively connected to at least one of the transaxle systems and being movable between a minimum position corresponding to a minimum driving speed of at least one of the driving wheels and a maximum position corresponding to a maximum driving speed of the at least one of the driving wheels, with the driving speed being infinitely variable between the minimum and maximum driving speeds through movement of the speed control actuator between the minimum and maximum positions; and
    a speed-range control actuator operatively connected to the two or more transaxle systems and configured to designate one of two or more selectable speed-ranges within which the one or more speed control actuators are permitted to operate, the speed of each driving wheel being determined by a combination of the designated speed-range and a position of the one or more speed control actuators.

2. The vehicle of claim 1, wherein the one or more speed control actuators comprise a pair of speed control levers, each of the speed control levers being operatively coupled to a movable speed control arm of a respective transaxle system.

3. The vehicle of claim 2, wherein each of the speed control levers is coupled to a respective speed control arm via a speed control bar or a speed control cable.

4. The vehicle of claim 1, wherein the speed-range control actuator is a speed-range pedal that is operatively coupled to speed-range arms of each of the two or more transaxle systems.

5. The vehicle of claim 4, wherein the speed-range pedal is coupled to each of the speed-range arms via a speed control bar or a speed control cable.

6. The vehicle of claim 1:
    wherein the speed-range control actuator includes a minimum position corresponding to a minimum speed-range and a maximum position corresponding to a maximum speed-range, with the speed-range being infinitely variable between the minimum and maximum speed-ranges through movement of the speed-range control actuator between the minimum and maximum positions.

7. The vehicle of claim 1, wherein the speed-range control actuator is movable regardless of a position of the one or more speed control actuators.

8. The vehicle of claim 1, wherein the one or more speed control actuators include:
    a left speed control lever operatively connected to a left transaxle system of the two or more transaxle systems for controlling a left speed of a left driving wheel of the two more driving wheels; and
    a right speed control lever operatively connected to a right transaxle system of the two or more transaxle systems for controlling a right speed of a right driving wheel of the two more driving wheels,
    wherein a combination of the left speed and the right speed determines a driving speed and a driving direction of the vehicle.

9. A zero-turn ("ZT") lawnmower comprising:
    a mainframe;
    an engine supported on the mainframe and configured to output rotational power;
    two or more driving wheels rotatably mounted to an underside of the mainframe;
    one or more driven wheels rotatably mounted to the mainframe for supporting the mainframe along with the driving wheels;
    a mowing deck connected to the mainframe and operatively coupled to the output of the engine for rotating one or more blades mounted in the mowing deck;
    an operator seat or platform attached to the mainframe;
    two or more transaxle systems, each transaxle system being connected to the engine and to a respective driving wheel such that each transaxle system is configured to translate the rotational power from the engine to the respective driving wheel;
    one or more speed control actuators, each speed control actuator being operatively connected to at least one of the transaxle systems and being movable between a minimum position corresponding to a minimum driving speed of at least one of the driving wheels and a maximum position corresponding to a maximum driving speed of the at least one of the driving wheels, with the driving speed being infinitely variable between the minimum and maximum driving speeds through movement of the speed control actuator between the minimum and maximum positions; and
    a speed-range control actuator operatively connected to the two or more transaxle systems and configured to designate one of two or more selectable speed-ranges within which the one or more speed control actuators are permitted to operate, the speed of each driving wheel being determined by a combination of the designated speed-range and a position of the one or more speed control actuators.

10. The lawnmower of claim 9, wherein the one or more speed control actuators comprise a pair of speed control levers, each of the speed control levers being operatively coupled to a movable speed control arm of a respective transaxle system.

11. The lawnmower of claim 10, wherein each of the speed control levers is coupled to a respective speed control arm via a speed control bar or a speed control cable.

12. The lawnmower of claim 9, wherein the speed-range control actuator is a speed-range pedal that is operatively coupled to speed-range arms of each of the two or more transaxle systems.

13. The lawnmower of claim 12, wherein the speed-range pedal is coupled to each of the speed-range arms via a speed control bar or a speed control cable.

14. The lawnmower of claim 9, wherein the speed-range control actuator is configured to disengage the mowing deck from the output of the engine when the speed-range control actuator is moved to designate one of the two or more speed ranges.

15. The lawnmower of claim 9:
    wherein the speed-range control actuator includes a minimum position corresponding to a minimum speed-range and a maximum position corresponding to a maximum speed-range, with the speed-range being infinitely variable between the minimum and maximum speed-ranges through movement of the speed-range control actuator between the minimum and maximum positions.

16. The lawnmower of claim 9, wherein the speed-range control actuator is movable regardless of a position of the one or more speed control actuators.

17. The lawnmower of claim 9, wherein the one or more speed control actuators include:
   a left speed control lever operatively connected to a left transaxle system of the two or more transaxle systems for controlling a first speed of a left driving wheel of the two more driving wheels; and
   a right speed control lever operatively connected to a right transaxle system of the two or more transaxle systems for controlling a second speed of a right driving wheel of the two more driving wheels,
      wherein a combination of the left speed and the right speed determines a driving speed and a driving direction of the vehicle.

18. An infinitely speed variable control system, comprising:
   two or more transaxle systems, each transaxle system being connected to a respective driving wheel such that each transaxle system is configured to translate the rotational power to the respective driving wheel;
   one or more speed control actuators, each speed control actuator being operatively connected to at least one of the transaxle systems and being movable between a minimum position corresponding to a minimum driving speed of at least one of the driving wheels and a maximum position corresponding to a maximum driving speed of the at least one of the driving wheels, with the driving speed being infinitely variable between the minimum and maximum driving speeds through movement of the speed control actuator between the minimum and maximum positions; and
   a speed-range control actuator operatively connected to the two or more transaxle systems and configured to designate one of two or more selectable speed-ranges within which the one or more speed control actuators are permitted to operate, the speed of each driving wheel being determined by a combination of the designated speed-range and a position of the one or more speed control actuators.

* * * * *